United States Patent
Clute

(10) Patent No.: US 11,904,799 B2
(45) Date of Patent: Feb. 20, 2024

(54) SEAT-BELT RETRACTOR

(71) Applicant: Autoliv Development AB, Vargarda (SE)

(72) Inventor: Günter Clute, Elmshorn (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 254 days.

(21) Appl. No.: 17/594,986

(22) PCT Filed: May 6, 2020

(86) PCT No.: PCT/EP2020/062494
§ 371 (c)(1),
(2) Date: Nov. 4, 2021

(87) PCT Pub. No.: WO2020/225271
PCT Pub. Date: Nov. 12, 2020

(65) Prior Publication Data
US 2022/0281408 A1  Sep. 8, 2022

(30) Foreign Application Priority Data
May 6, 2019  (DE) ...................... 10 2019 206 439.6

(51) Int. Cl.
*B60R 22/46*  (2006.01)
(52) U.S. Cl.
CPC .. *B60R 22/4628* (2013.01); *B60R 2022/4642* (2013.01)
(58) Field of Classification Search
CPC . B60R 22/34; B60R 22/3413; B60R 22/4628; B60R 2022/2642; B60R 22/46
See application file for complete search history.

(56) References Cited

U.S. PATENT DOCUMENTS

| | | | | |
|---|---|---|---|---|
| 6,655,743 | B1 * | 12/2003 | Parizat ................ | B60R 22/3413 |
| | | | | 297/475 |
| 2008/0006732 | A1 * | 1/2008 | Clute ...................... | B60R 22/34 |
| | | | | 242/390.8 |
| 2009/0309345 | A1 | 12/2009 | Specht | |
| 2011/0147510 | A1 * | 6/2011 | Lucht ...................... | B60R 22/46 |
| | | | | 242/390.8 |
| 2020/0130641 | A1 * | 4/2020 | Jabusch ................... | B60R 22/46 |
| 2022/0118940 | A1 * | 4/2022 | Zhang ..................... | B60R 22/40 |

FOREIGN PATENT DOCUMENTS

| | | | | |
|---|---|---|---|---|
| DE | 10204476 | A1 | 8/2003 | |
| DE | 102005014521 | A1 | 10/2006 | |
| DE | 102018219040 | A1 * | 5/2020 | |
| DE | 102021209478 | A1 * | 3/2023 | ......... B60R 22/3413 |
| WO | 2018054779 | A1 | 3/2018 | |

OTHER PUBLICATIONS

R. Jabusch, DE 10 2018 219040 Belt retractor, Machine English Translation, ip.com (Year: 2018).*

* cited by examiner

*Primary Examiner* — Karen Beck
(74) *Attorney, Agent, or Firm* — DICKINSON WRIGHT PLLC

(57) ABSTRACT

A seat-belt retractor having a seat-belt spool and a drive device, both the seat-belt spool and the drive device being modular sub-assemblies and designed as a seat-belt spool module and a drive device module, and said seat-belt spool module and drive device module being interconnectable in different orientations relative to one another via a structural interface.

11 Claims, 2 Drawing Sheets

Figure 4:
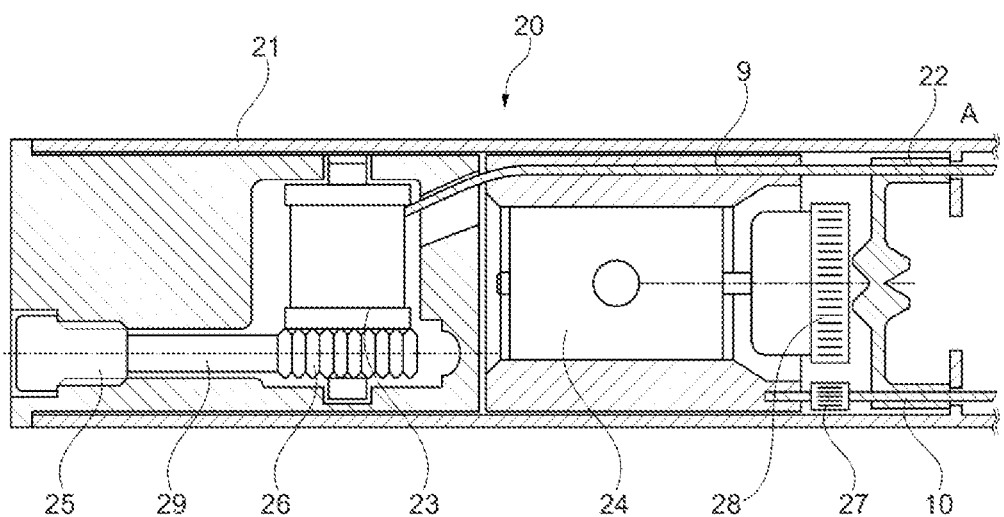

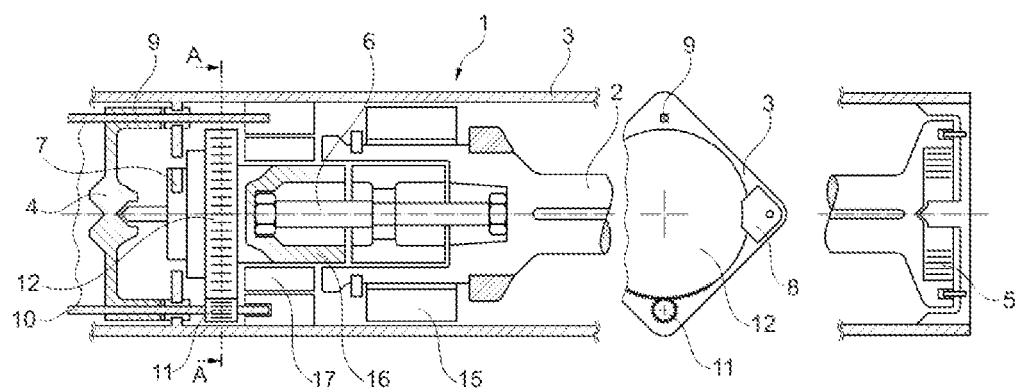
Fig. 1
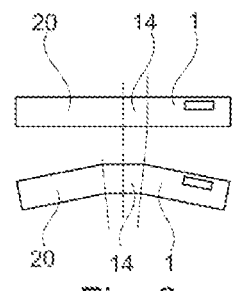
Fig. 5
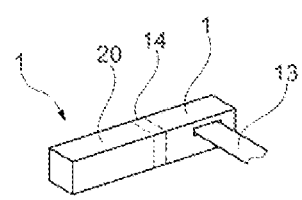
Fig. 2
Fig. 3

SEAT-BELT RETRACTOR

The present invention relates to a seat-belt retractor having the features of the preamble of claim 1.

Seat-belt retractors comprise as basic components a load-bearing frame and a seat-belt spool which is rotatably mounted in the frame and onto which a safety belt can be wound. The frame serves not only for mounting the seat-belt spool, but also for fastening to a seat structure or to a vehicle structure, and for this purpose is made of a correspondingly thick steel sheet which is bent into a U-shaped frame.

Vehicle seats having safety-belt devices are known, for example, in the use as front seats in convertibles, in which at least the seat-belt retractors of the safety-belt devices are fastened in the backrests of the vehicle seats. In this case, due to the lack of a load-bearing B-pillar and for reasons relating to access to the rear seats or for reasons relating to the distance from the rear vehicle structure, the seat-belt retractors are preferably integrated into the backrests of the vehicle seats, which must therefore also be designed to absorb the tensile forces acting in the case of restraint. The seat-belt retractors themselves have all the basic components of a standard seat-belt retractor and are equipped only with various additional sub-assemblies provided especially for installation in the backrest, such as self-aligning inertia sensors.

In the basic design thereof, the vehicle seat has a seat structure consisting of several load-bearing structural parts which serve to fasten the vehicle seat to the vehicle structure. The seat structure is equipped with springs and upholstery in order to improve sitting comfort and is also used for the fastening of further components, such as various seat adjustment mechanisms, including the associated electric motors, and further components, such as heating devices, sensors, displays, headrests and the like.

In modern vehicles with autonomous driving systems, there is an increasing demand for greater adjustability of vehicle seats in different orientations and positions such that the vehicle occupant can use the freedom obtained by autonomous driving, e.g., for more meaningful communication with the other occupants, for extended and more intensive rest phases, or even for work, and can orient the vehicle seat accordingly. As a result, the safety-belt device and in particular the seat-belt retractor no longer have to be fastened to the vehicle structure as heretofore, but rather to the vehicle seat, as has already been the case, for example, with the front seats of convertibles.

One problem, however, is that the seat-belt retractor, with its further components, has a comparatively large space requirement due to its external dimensions, so that installation in the vehicle seat can be problematic. This is due, in particular, to the fact that, for the tensile forces to be absorbed, the safety belt, given a predetermined width of, for example, 46 mm, must have a certain minimum thickness and, for the restraint of the occupant, a certain minimum length of, for example, 2,500 mm, so that when the safety belt is fully wound up, the wound belt on the seat-belt spool has a correspondingly large external diameter due to the volume of the safety belt that is to be wound up. This large wound belt is further expanded by a correspondingly large frame of the seat-belt spool and by further components of the seat-belt retractor, such as a force-limiting device, sensor units, a drive spring, a blocking device or the like.

Furthermore, modern seat-belt retractors comprise actuators, such as a drive device, formed by an irreversible belt tensioner and/or a reversible belt tensioner having an electric motor and a transmission, by means of which the belt shaft may be actively driven in the winding or unwinding direction.

In opposition to the seat-belt retractor's increased requirement for installation space is also the fact that the space available in the backrest of the vehicle seat is limited, and its shape and distribution are a function of the shape of the backrest, and of the components further accommodated therein or the upholstery and springs provided.

These increased demands placed on the available installation space and the limited installation spaces available in modern vehicle seats constitute a considerable design challenge for the design of the seat-belt retractor and of the vehicle seat. At the same time, the seat-belt retractor should be usable for as many different vehicle seats as possible so that it can be produced cost-effectively in large quantities.

Against this background, the invention is based upon the aim of providing a seat-belt retractor having a seat-belt spool and a drive device which may have an improved design with regard to the utilization of an installation space available in a backrest of a vehicle seat.

In order to achieve the aim, a seat-belt retractor with the features of claim 1 is proposed. Further preferred developments of the invention can be taken from the dependent claims, the figures, and the associated description.

According to the fundamental concept of the invention, according to claim 1, a seat-belt retractor having a seat-belt spool and a drive device is proposed, wherein both the seat-belt spool and the drive device are modular sub-assemblies and designed as a seat-belt-spool module and a drive-device module, and said seat-belt-spool module and drive-device module are interconnectable in different orientations relative to one another via a structural interface.

The solution according to the invention is thus based upon two, essential structural features. Firstly, the seat-belt spool and the drive device are of modular design in the form of a seat-belt-spool module and a drive-device module, which comprise all components associated with the seat-belt spool and with the drive device and which are required for the function of the seat-belt spool and the drive device. The seat-belt-spool module and the drive-device module thus form self-contained sub-assemblies and can thus be arranged individually in the backrest according to the installation space available. Both the seat-belt-spool module and the drive-device module may be produced in large quantities, irrespective of the backrest individually provided for disposal. Secondly, it is proposed that the seat-belt-spool module and the drive-device module be interconnectable in different orientations via a structural interface, whereby the individual installation space geometry in the backrest can be taken into account. The structural interface allows different orientations of the modules relative to one another, without their having to be changed structurally for this purpose.

In so doing, the sub-assembly of the seat-belt-spool module may preferably comprise a seat-belt spool and/or a blocking device blocking the seat-belt spool in the pull-out direction when activated, and/or a drive spring tensioning the seat-belt spool in the winding direction, and/or a simple or adaptive force-limiting device, and/or one or more sensor units. The seat-belt-spool module thus preferably comprises the main components or all components of a modern seat-belt retractor for winding and blocking a safety belt, including the force-limiting device required for the force-limited forward displacement of the occupant in the event of an accident.

It is further proposed that the sub-assembly of the drive-device module comprise an electric motor and/or a pyrotechnic drive unit, and/or a transmission coupled to the electric motor and/or the pyrotechnic drive unit, and/or a control unit controlling the electric motor and/or the pyrotechnic drive unit. The drive-device module thus comprises the main components or all components required for driving the seat-belt spool in the winding direction or also for driving the seat-belt spool for purposes of comfort.

It is further proposed that both the seat-belt-spool module and the drive-device module have a housing. The housings form the structural frame for mounting and fastening the components in the modules and can additionally cover the components towards the outside so that the components themselves are protected with respect to the environment and, vice versa, from reciprocal mechanical influences.

It is further proposed that the structural interface in this case be formed by an adapter part which connects the housing of the seat-belt-spool module to the housing of the drive-device module, the shape of which adapter part defines the orientation of the seat-belt-spool module in relation to the drive-device module.

In this case, it is further proposed that a bearing plate which is supported on the housing and on which the seat-belt spool and/or the drive device are mounted be provided on the side of the housing facing the structural interface. The seat-belt spool and/or the drive device are thus mounted on the side facing the respective other module and are thus fixed in the position and orientation on this side, whereby the transmission of the drive movement can be simplified. Furthermore, the seat-belt spool and/or the drive device, for the case of an angular arrangement of the modules to one another that does not equal 180 degrees, are mounted as close as possible to the deflection of the drive movement so that the transverse forces caused by the deflection of the drive movement can be absorbed particularly well in terms of bearing technology, and a good and compact mounting of the seat-belt spool and/or of the drive device can be facilitated.

The housings of the seat-belt-spool module and of the drive-device module may be tubular. In this case, the seat-belt spool and the drive device are arranged in the tubular housings and are thereby protected from external influences in all circumferential directions. Furthermore, the tubular housings may be designed to be dimensionally stable with respect to the transverse forces and torsional forces acting on the modules.

Furthermore, the housings of the seat-belt-spool module and of the drive-device module may have an identical cross-sectional shape, so that, in a straight arrangement, they complement each other at an angle of the longitudinal axes to one another of 180 degrees with respect to an elongated seat-belt retractor with a cross-sectional geometry that is constant in the direction of the longitudinal axis.

Furthermore, the adapter part and at least one of the housings of the seat-belt-spool module and/or of the drive-device module may have an identical cross-sectional geometry at least in the region of the connection, whereby cross-sectional jumps in the transition between the adapter part and the seat-belt-spool module and/or the drive-device module can be avoided.

It is further proposed that at least one force-transmission device be provided which transmits the drive movement from the drive-device module to the seat-belt spool of the seat-belt-spool module via the structural interface. The force-transmission device serves to transmit the drive movement across the interface and can be formed, for example, by a transmission, a shaft, a traction cable or the like, wherein the force-transmission device is preferably inherently flexible and can thereby transmit the drive movement, even where an angular arrangement of the modules is not equal to 180 degrees, while deflecting the drive movement. Such a flexible force-transmission device may, for example, be a pull cable or a flex shaft. Furthermore, the force-transmission device may also be realized by an angular gear.

The invention is explained below using preferred embodiments with reference to the accompanying figures. Shown are:

FIG. 1 a seat-belt-spool module of a seat-belt retractor according to the invention in sectional view; and FIG. 2 a seat-belt retractor according to the invention; and FIG. 3 a seat-belt retractor according to the invention having various adapter parts; and FIG. 4 a drive-device module of a seat-belt retractor according to the invention in sectional view; and FIG. 5 a sectional view through the seat-belt retractor along the section line A-A.

FIG. 1 shows a seat-belt-spool module 1, comprising a tubular housing 3 and a seat-belt spool 2 rotatably mounted therein. The seat-belt spool 2 is spring-loaded in the winding direction via a drive spring 5, which in turn is supported on the housing 3 in a rotationally-fixed manner. The seat-belt spool 2 serves to wind up a safety belt 13 which can be seen in FIG. 2 and which is fed out of the housing 3 through a slot. An adaptive force-limiting device 6 in the form of a torsion bar is furthermore provided in a coaxial arrangement with respect to the seat-belt spool 2. The torsion bar has several sections with different diameters and force-limiting levels resulting therefrom, which can be activated independently of one another by a switching device by fixing different profile sections of the torsion bar in relation to the seat-belt spool 2 and/or in relation to the housing 3, and thereby enable a force-limited belt webbing extension at different force-limiting levels in the event of a blocked seat-belt spool 2. The torsion bar is connected with its right end in the illustration to the seat-belt spool 2 in a rotationally-fixed manner and with its left end in the illustration to a profile head 16 in a rotationally-fixed manner. The profile head 16 is thus connected in a rotationally-fixed manner to the seat-belt spool 2 via the torsion bar until the force-limiting level defined by the plastic deformation limit of the torsion bar is reached. The profile head 16 is furthermore a carrier for a blocking device 7 in the form of a blocking pawl pivotably mounted thereon, which blocking pawl, when triggered, blocks the seat-belt spool 2 in the pull-out direction via the connection via the torsion bar by being introduced into a toothing fixed to the housing. The profile head 16 is mounted on a bearing plate 4 which is supported in a rotationally-fixed manner in the housing 3. The profile head 16 also has an external toothing 12, which may be provided in one piece on the profile head 16 or may also be formed by a toothed wheel connected in a rotationally-fixed manner to the profile head 16.

FIG. 4 shows the drive-device module 20, which likewise has a tubular housing 21 which ideally has the same cross-sectional shape and the same dimensions in length and/or height and/or width as the housing 3 of the seat-belt-spool module 1. An irreversible belt-tensioning device and a reversible belt-tensioning device are provided in the drive-device module 20.

The irreversible belt-tensioning device comprises a cable drum 23 which is rotatably mounted or held in the housing 21 with its axis of rotation perpendicular to the longitudinal axis of the housing 21 and in a non-displaceable manner. Provided on the cable drum 23 is a toothed wheel 26 connected in a rotationally-fixed manner to the cable drum 23, in the external toothing of which a toothed rack 29 engages or can be moved for engagement. The toothed rack 29 is displaceably guided in a cylindrical cavity and thereby forms a piston that wears the cavity on one side. Furthermore, a pyrotechnic gas generator 25 is provided which, upon activation, abruptly releases a gas flow into the cavity and thereby drives the toothed rack 29, which then drives the cable drum 23 in the winding direction of a pull cable fastened to the cable drum 23 by engaging in the toothing of the toothed wheel 26. The pull cable here forms an inherently flexible, first force-transmission device 9, the function of which will be explained in more detail below.

The reversible belt-tensioning device comprises an electric motor 24 which is supported in the housing 21 in a rotationally-fixed manner in relation to the axis of rotation of its output shaft. The reversible belt-tensioning device further comprises a transmission formed from a driving toothed wheel 28 connected in a rotationally-fixed manner to the motor shaft and an output toothed wheel 27 which is connected in a rotationally-fixed manner to a second force-transmission device 10 formed by a flex shaft. The electric motor 24 is mounted on a bearing plate 22 on the side of the driving toothed wheel 28. The flex shaft, i.e., the force-transmission device 10, thus extends from the drive-device module 20 over a structural interface into the seat-belt-spool module 1 and has at its end a driving toothed wheel 11 which engages with its toothing in the external toothing 12 of the profile head 16. Together with the driving toothed wheel 11, the external toothing 12 forms a further transmission in the seat-belt-spool module 1 for transmitting the rotational movement of the flex shaft to the profile head 16 and, via the torsion bar, to the seat-belt spool 2.

The bearing plate 22 has two, diametrically-arranged through-openings through which the first and the second force-transmission devices 9 and 10 are fed separately from one another. The bearing plate 22 is likewise supported on the inside of the housing 21 in a rotationally-fixed manner with respect to the axis of rotation of the electric motor 24 or with respect to the longitudinal axis of the housing 21.

The seat-belt-spool module 1 and the drive-device module 20 are designed at a structural interface—in this case, the respective front face—in such a way that they can be connected to one another in different angular positions via an adapter part 14. For this purpose, the seat-belt-spool module 1 and the drive-device module 20 do not have to be changed structurally; the orientation of the modules at the predetermined angle is defined here solely by the adapter part 14. The individualization into the different orientations is thus carried out via the adapter part 14. In FIG. 2 and the upper illustration in FIG. 3, the adapter part 14 is designed as a tubular intermediate piece having front faces aligned in parallel to one another, by means of which the modules are connected to one another in a 180-degree alignment, i.e., a straight alignment with one another. In the lower illustration in FIG. 3, the adapter part 14 is designed with two front faces oriented at an angle to one another not equal to 180 degrees, so that the modules attached thereto are likewise oriented at an angle to one another not equal to 180 degrees with their longitudinal axes.

The housings 3 and 21 are preferably tubular and designed as closed hollow profiles so that they are particularly torsion-resistant, which in turn is advantageous for the reaction forces to be absorbed during the blocking of the seat-belt spool 2 and during tensioning. Furthermore, the housings 3 and 21 may complete or stiffen the structure of the backrest of the vehicle seat so that the vehicle seat may subsequently be more easily executed and simplified in its structural design. The housings 3 and 21 preferably have an identical cross-sectional geometry and/or length so that they are configured in an inverted arrangement, e.g., for installation in the left and right vehicle seats in a backrest having an identical or mirror-symmetrical shape of the cavity provided for installation. The adapter part 14 likewise has a cross-sectional geometry preferably identical to at least one of the housings 3 and 21 so that the cross-sectional jumps, which are unfavorable for the absorption of force, can be reduced in the transition points from the adapter part 14 to the housings 3 and 21. If the housings 3 and 21 of the modules have a different cross-sectional geometry, the adapter part 14 may also be used for a more continuous transition of the outer shape, in that the adapter part 14 has the cross-sectional shape of one housing 3 or 21 on one side and the cross-sectional shape of the other housing 3 or 21 on the other side. The housings 3 and 21 further have an interior, which is preferably non-circular, e.g., square, in cross-section, on the inner wall of which the components of the modules are supported in a rotationally-fixed manner with respect to the longitudinal axes of the housings 3 and 21.

The two force-transmission devices 9 and 10 are preferably inherently flexible, e.g., designed as a pull cable or as a flex shaft, and may thus adapt to different angular orientations of the modules. In this case, they can be deflected, for example, into the through-openings of the bearing plates 22 and 4. For this purpose, the bearing plates 4 and 22 are preferably arranged on the side of the respective housing 3 or 21 which forms the structural interface and, in the mounted position, faces the respective other housing 3, 21 of the other module. In this case, the structural interface is formed by the side of the housing 3, 21, which side is provided for attaching the adapter part 14, and by the adapter part 14 itself, wherein the shaping of the adapter part 14 then defines the angle of the orientations of the other housing 3, 21 to be fastened thereto of the other module. The bearing plates 4 and 22 may also be designed as a single bearing plate 4 or 22, which on one side serves for mounting the profile head 16 or the seat-belt spool 2 and on the other side forms a bearing point for mounting the motor shaft or the transmission of the electric motor 24.

If no adapter part 14 is provided, and the seat-belt-spool module 1 and the drive-device module 20 are connected to one another in a straight orientation, the structural interface is the connection point of the two modules.

The invention claimed is:

1. A seat-belt retractor comprising;
    a seat-belt spool module in the form of a modular subassembly having a tubular seat-belt spool module housing elongated along a longitudinal axis and forming an end thereof,
    a drive device module in the form of a modular subassembly having a tubular drive device module housing elongated along a longitudinal axis and forming an end thereof,
    wherein
    the seat-belt-spool module and the drive-device module are interconnectable in an end-to-end relationship in different angular orientations relative to one another via an adapter part which is connected to the seat-belt-spool module housing end and to the drive-device module end, the shape of the adapter part defining the orientation of the seat-belt-spool module in relation to the drive-device module.

2. The seat-belt retractor according to claim 1, wherein the seat-belt-spool module further comprises:

a seat-belt spool, a blocking device blocking the seat-belt spool in a pull-out direction upon an activation, and one or more of; a drive spring tensioning the seat-belt spool in a winding direction, a simple or an adaptive force-limiting device, and one or more sensor units.

3. The seat-belt retractor according to claim 1, wherein the drive-device module further comprises:

an electric motor; and one or more of;

a pyrotechnic drive unit, a transmission coupled to the electric motor and a control unit controlling the electric motor or the pyrotechnic drive unit.

4. The seat-belt retractor according to claim 1, wherein the seat-belt-spool module or the drive-device module has, on the side facing the adapter part, a bearing plate which is supported on the respective housing and on which the seat-belt spool or the drive device is mounted.

5. The seat-belt retractor according to claim 1, wherein the seat-belt-spool module housing and the drive-device module housing have an identical cross-sectional shape.

6. The seat-belt retractor according to claim 1, wherein the adapter part and at least one of the seat-belt-spool module housing and the drive-device module housing have an identical cross-sectional geometry in a region of their connection to the adapter part.

7. The seat-belt retractor according to claim 2, wherein at least one force-transmission device is provided which transmits a drive movement from the drive-device module to the seat-belt spool of the seat-belt-spool module through the adapter part.

8. The seat-belt retractor according to claim 7, wherein the force-transmission device is flexible.

9. The seat-belt retractor according to claim 1, wherein the seat belt spool module housing and the drive device module housing are aligned in a generally co-linear relationship with their respective longitudinal axes forming an angle of about 180°.

10. The seat-belt retractor according to claim 1, wherein the seat belt spool module housing and the drive device module housing are aligned in a co-linear relationship with their respective longitudinal axes forming an angle of 180°.

11. The seat-belt retractor according to claim 1, wherein the seat belt spool module housing and the drive device module housing are aligned with their respective longitudinal axes screwed from an angle of 180°.

* * * * *